Merriman & Lewis,
Animal Trap.

No. 109,035. Patented Nov. 8. 1870.

Witnesses,
C. A. Shepard
H. S. Bartholomew

Inventor,
John B. Merriman and
George B. Lewis. By James Shepard atty.

United States Patent Office.

JOHN B. MERRIMAN AND GEORGE B. LEWIS, OF PLANTSVILLE, CONNECTICUT; SAID LEWIS ASSIGNS HIS RIGHT TO SAID MERRIMAN.

Letters Patent No. 109,035, dated November 8, 1870.

IMPROVEMENT IN ANIMAL-TRAPS.

The Schedule referred to in these Letters Patent and making part of the same.

We, JOHN B. MERRIMAN and GEORGE B. LEWIS, both of Plantsville, in the county of Hartford and State of Connecticut, have invented a new and improved Animal-Trap, for catching moles, rats, &c., which we term a "Novelty Trap," and of which the following is a specification.

Our invention consists—

First, in the employment of a frame, supported by pins or legs, and provided with a pair of jaws upon two opposite sides, arranged with a spring, and proper mechanism for setting the same, as hereinafter described.

Second, it consists of removable side-pieces attached to the legs of the frame upon two of its sides, and of a removable bait-hook arranged immediately below the pan, so that the same trap may be used for either rats or moles, as hereinafter described.

In the accompanying drawing—

Figure 1:
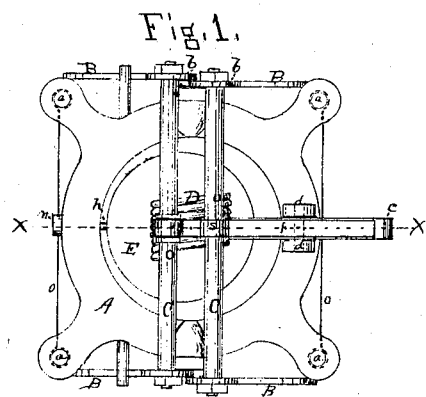

Figure 1 is a top view of a trap of our invention.

Figure 2:
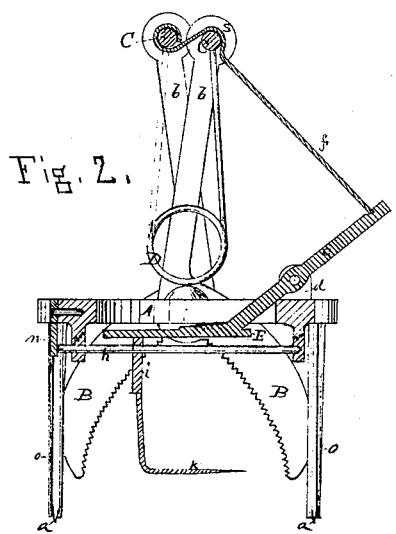

Figure 2, a vertical section of the same, on line $x\,x$.

Figure 3:
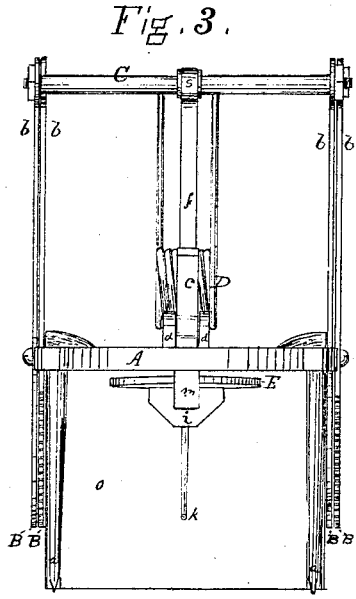

Figure 3, a side elevation of the same; and

Figure 4:
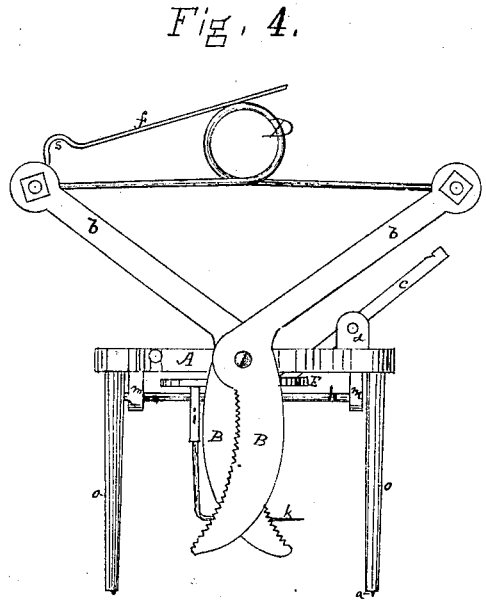

Figure 4, a front elevation of the same, when sprung.

A designates the frame, which may be made of cast-iron and of any pleasing design, and is provided with four pins or legs, $a\,a\,a\,a$.

On two opposite sides of the frame A the jaws B B are pivoted.

Extending upward from each of the jaws B is a lever, $b$.

The ends of the levers $b$, which are directly opposite each other, are connected by a rod, C.

A spring, D is secured to each of the rods C in such manner as to throw the ends of the levers $b\,b$ $b\,b$ outward and the jaws B B inward.

The spring D being rigidly secured to the rods C, said rods should be free to partially rotate in the ends of the levers $b$.

The frame A is provided with an opening of a proper size and shape to allow the pan E to work through the same, which pan E is provided with a lever, $c$, pivoted between lugs $d\,d$.

A latch, $f$, is hinged to the rod C for the purpose of setting the trap, as shown in figs. 1, 2, and 3.

Immediately below the pan E is the shaft $h$, to which shaft is secured a T-lever, $i$, the end of said lever being formed into a bait-hook, $k$.

The shaft $h$ swings freely in the lugs $m$, and is held in place by the button $n$.

We also form, of sheet metal, two side pieces, $o\,o$, having a coil or roll upon each of their ends to encircle the legs $a\,a$.

A top view of said side pieces may be seen in fig. 1, the parts which are under the frame being represented by broken lines.

In fig. 3, one of the side pieces, $o$, is removed, to better show the other parts.

The operation is as follows:

The trap being set, as shown in figs. 1, 2, and 3, the side pieces $o\,o$ prevent the animal from approaching the bait only by passing between one set of the jaws B B.

A nibble at the bait moves the T-lever $i$, which raises the pan E, and thus liberates the latch $f$ from the lever $c$, when the spring D throws the ends of the levers $b\,b$ outward and closes the jaws B B, as shown in fig. 4, when the pair of jaws, through which the animal passed to approach the bait, will secure the animal beyond any possibility of escape.

By making the trap of various sizes it may be made to take larger or smaller animals.

When desired to use this trap exclusively for a mole-trap, the side pieces $o\,o$ are removed by slipping them from the legs or pins $a$.

The button $n$ is turned sidewise when the shaft $h$ is slipped out from the lugs $m$ and removed.

With a shingle or other thin tool two crevices are made across the mole's hole suitable to allow free action of the jaws B B, care being taken in making said crevices to disturb the dirt around the mole-hole as little as possible.

The dirt over the hole between the crevices is then stamped down, the legs or pins $a$ crowded into the ground, while the jaws B B are in the crevices before described, and the pan E, resting upon the dirt between them, when the trap is set by means of the latch $f$ and lever $c$.

The mole, in the next attempt to traverse his hole, raises the pan E by moving the dirt under it, and is caught by one of the pair of jaws B B.

In the latch $f$ we form a curve, $g$, fig. 2, into which one of the rods C rests, when the trap is set. This curve assists to hold the rods C C together, and receives a large share of the power of the spring D, so that but little of the force of said spring is exerted upon the end of the latch, and consequently less power is required to lift the pan E and spring the trap than would be required if the latch $f$ was made on a straight line from the top of the rod C to the end of said latch, and, therefore, all the power of the spring exerted upon the latch $f$.

The advantages of our invention are as follows, viz:

The latch and lever for setting the trap are remote from the jaws, and, therefore, the trap may be set without danger of catching and injuring the fingers of the person setting it between the jaws. There is no part of the trap for the animal to step over or upon to approach the bait, and, therefore, as has been demonstrated by practice, it will be less suspicious about entering the trap than it would if obliged to step upon or over the trap, as is generally the case. It secures the animal by griping it around the body instead of the legs, and, therefore, holds said animal securely. It is arranged and adjusted so that the least nibble at the bait is sure to spring the trap. It is adapted for both rats and moles, and is compact and durable.

We claim as of our invention—

1. The combination of the T-lever $i$, bait-hook $k$, shaft $h$, pan E, lever $c$, latch $f$, rods C C, spring D, levers $b\ b\ b\ b$, jaws B B B B, frame A, legs $a\ a\ a\ a$, and side pieces $o\ o$, substantially as and for the purpose described.

2. The combination of the pan E, lever $c$, latch $f$, rods C C, spring D, levers $b\ b\ b\ b$, jaws B B B B, frame A, and legs $a\ a\ a\ a$, substantially as and for the purpose described.

3. The combination of the bait-hook $k$, T-lever $i$, and pan E, combined and operating together, substantially as described.

JOHN B. MERRIMAN.
GEORGE B. LEWIS.

Witnesses:
A. L. FREEMAN,
WALTER S. MERRELL.